US011030492B2

(12) United States Patent
Zeiler et al.

(10) Patent No.: US 11,030,492 B2
(45) Date of Patent: Jun. 8, 2021

(54) SYSTEMS, TECHNIQUES, AND INTERFACES FOR OBTAINING AND ANNOTATING TRAINING INSTANCES

(71) Applicant: Clarifai, Inc., New York, NY (US)

(72) Inventors: Matthew Zeiler, New York, NY (US); Jesse Rappaport, Brooklyn, NY (US); Samuel Dodge, San Francisco, CA (US); Michael Gormish, Redwood City, CA (US)

(73) Assignee: CLARIFAI, INC., New York, NY (US)

( * ) Notice: Subject to any disclaimer, the term of this patent is extended or adjusted under 35 U.S.C. 154(b) by 268 days.

(21) Appl. No.: 16/249,601

(22) Filed: Jan. 16, 2019

(65) Prior Publication Data

US 2020/0226431 A1 Jul. 16, 2020

(51) Int. Cl.
*G06K 9/62* (2006.01)
*G06N 20/00* (2019.01)
*G06N 7/00* (2006.01)

(52) U.S. Cl.
CPC .......... *G06K 9/6277* (2013.01); *G06K 9/628* (2013.01); *G06N 7/005* (2013.01); *G06N 20/00* (2019.01)

(58) Field of Classification Search
CPC .... G06K 9/6277; G06K 9/628; G06K 9/6264; G06K 9/6259; G06K 9/00664; G06N 20/00; G06N 7/005
See application file for complete search history.

(56) References Cited

U.S. PATENT DOCUMENTS

| | | | |
|---|---|---|---|
| 7,792,353 B2* | 9/2010 | Forman ................. | G06N 20/00 382/159 |
| 8,935,258 B2 | 1/2015 | Svore et al. | |
| D798,314 S | 9/2017 | Rad et al. | |
| 2017/0099200 A1* | 4/2017 | Ellenbogen ............ | G06N 20/00 |
| 2020/0151591 A1* | 5/2020 | Li .......................... | G06N 20/00 |
| 2020/0327449 A1* | 10/2020 | Tiwari .................. | G06N 20/20 |

(Continued)

OTHER PUBLICATIONS

Deng, Jia, et al. "Imagenet: A large-scale hierarchical image database." Computer Vision and Pattern Recognition, 2009. CVPR 2009. IEEE Conference on. IEEE, 2009.

(Continued)

*Primary Examiner* — Charles T Shedrick
(74) *Attorney, Agent, or Firm* — Buckley, Maschoff & Talwalkar LLC

(57) ABSTRACT

A previously trained classification model associated with the machine learning system is configured to process an input to generate i) a first prediction that represents a characteristic associated with the input, and ii) a representation of accuracy associated with the prediction. A retraining subsystem is configured to receive the input, the first prediction, and the representation of accuracy. The retraining subsystem processes the input to generate a prediction representing a characteristic. A sufficiency of certainty of the first prediction is determined based on at least the input, the first prediction, the measure of accuracy, and the second prediction. Based at least on the determined sufficiency the retraining subsystem causes the machine learning system to be automatically retrained, be retrained using the input with active learning or not retrained.

18 Claims, 7 Drawing Sheets

(56) References Cited

U.S. PATENT DOCUMENTS

2020/0364511 A1* 11/2020 Brown .................. G06F 40/216

OTHER PUBLICATIONS

Wang, Keze, et al. "Cost-effective active learning for deep image classification." IEEE Transactions on Circuits and Systems for Video Technology 27.12 (Dec. 2017): 2591-2600.

Lee, Dong-Hyun. "Pseudo-label: The simple and efficient semi-supervised learning method for deep neural networks." Workshop on Challenges in Representation Learning, ICML. vol. 3. Jul. 2013.

Blum, A., Mitchell, T. "Combining labeled and unlabeled data with co-training". COLT: Proceedings of the Workshop on Computational Learning Theory, Morgan Kaufmann, Jul. 1998, p. 92-100.

Qiao, Siyuan, et al. "Deep Co-Training for Semi-Supervised Image Recognition." arXiv preprint arXiv:1803.05984 (Mar. 15, 2018).

D. Lewis and J. Catlett. "Heterogeneous uncertainty sampling for supervised learning". In Proceedings of the International Conference on Machine Learning (ICML), pp. 148-156. Morgan Kaufmann, Jul. 1994.

B. Settles, M. Craven, and S. Ray. "Multiple-instance active learning". In Advances in Neural Information Processing Systems (NIPS), vol. 20, pp. 1289-1296. MIT Press, 2008b.

N. Roy and A. McCallum. "Toward optimal active learning through sampling estimation of error reduction". In Proceedings of the International Conference on Machine Learning (ICML), pp. 441-448. Morgan Kaufmann, Jun. 2001.

Sener, Ozan, and Silvio Savarese. "Active learning for convolutional neural networks: A core-set approach." ICLR 2018 Conference Blind Submission (Feb. 15, 2018).

* cited by examiner

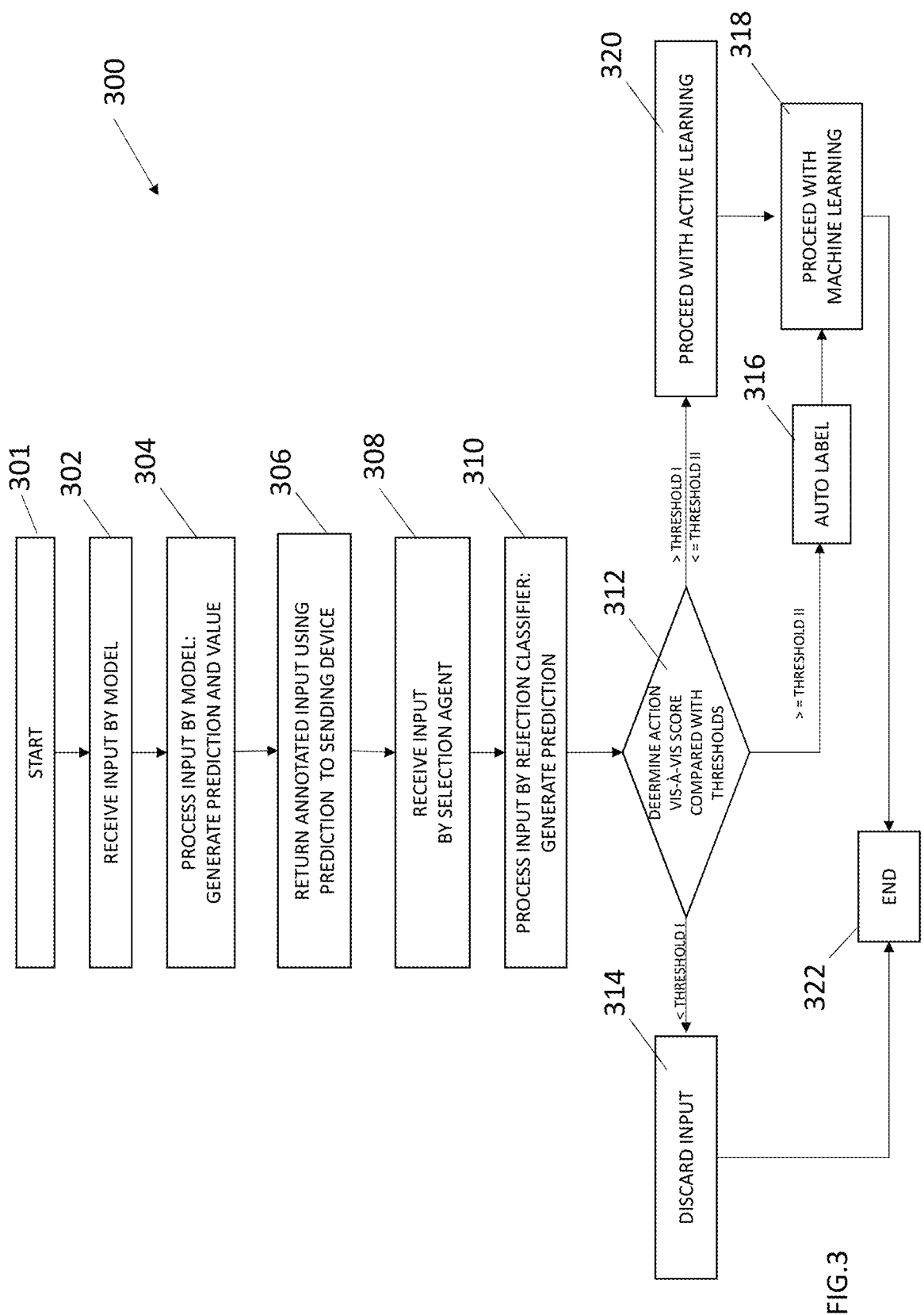

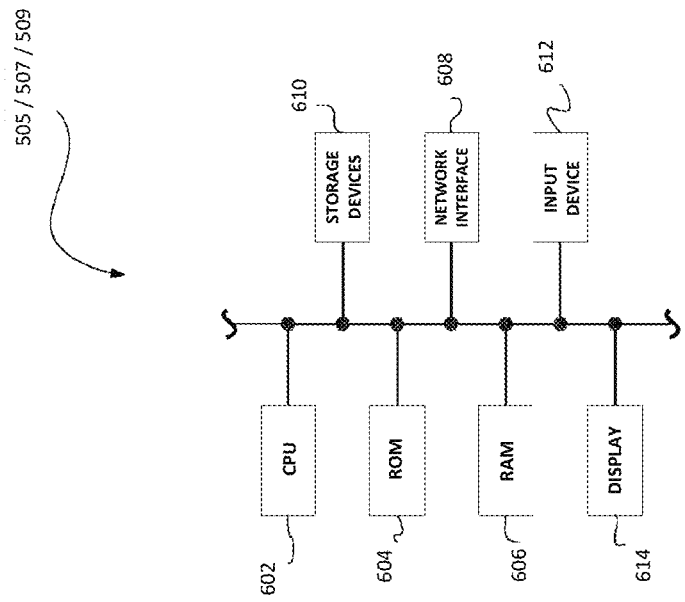

SYSTEMS, TECHNIQUES, AND INTERFACES FOR OBTAINING AND ANNOTATING TRAINING INSTANCES

FIELD OF THE INVENTION

The present disclosure relates, generally, to artificial intelligence and, more particularly, to improvements in machine learning.

BACKGROUND

Artificial intelligence (A/I) systems and, more specifically, machine learning models provide automation in many different contexts. For example, A/I systems can generate predictions and annotate digital assets, such as images, based on such predictions. For example, an image of a cat can be processed by an A/I system to generate predictions associated with the image, and to annotate the image with various labels, such as "animal," "feline," "cat," "pet," "family friendly," "child-safe," or countless others. Unfortunately, A/I systems make mistakes while generating such predictions. Continuing with the previous example, an A/I system may incorrectly predict and annotate the image with the word, "dog." Such mistakes can occur because of problems with the input (e.g., blurry or partial images), but can also occur because an A/I system may have not been exposed to the content previously, and the predictions are essentially a random selection among the available predictions.

In order for an A/I system to operate well, machine learning is employed for training and to improve the system's operations over time. For example, training data are received and processed by an A/I system, and the system "learns" as new information is acquired or corrections to errors previously made by the A/I system are ingested. Often, manual data processing is needed to train an A/I system, and a human is needed to provide information that the A/I system otherwise would be unable to provide. In the context of categorizing digital assets (e.g., images), for example, a manual process can include sending images to a user or subject matter expert, such as doctor for medical images or a designer for fashion images, and receiving back from the user information, such as category labels for the assets, that are then used in machine learning and training the A/I system. The expectation is that A/I systems will operate more accurately over time as machine learning is implemented.

FIG. 1 is a simple block diagram illustrating the use and training of an A/I system in a prior art implementation. Typically data from one or more repositories 107, such as images stored in on-line databases, are accessed. The images are received by one or more manual labeling systems 109, and thereafter categorized by people. A training platform 109 receives the categorization information that has been manually associated with the images, and the A/I system 105 is trained therefrom. Then once the system is available, input, such as images, is received from a user and processed by an A/I system 105 (shown as "Model" in FIG. 1). The A/I system 105 processes the input to provide respective predictions and return those predictions or categories to the user.

Such practice is costly and can be inefficient and impractical, particularly for systems that require millions of assets to be categorized. Further, the model is only trained irregularly when a data scientist is available and a new repository has become available.

Accordingly, there exists an unfulfilled need for a technological solution that can automatically and continuously collect and annotate data in an A/I system, including while training the A/I system.

SUMMARY

In one or more implementations, a system and method are provided for retraining a machine learning system. In or more implementations, a previously trained classification model associated with the machine learning system is configured to process an input. The input is processed to generate i) a first prediction that represents a characteristic associated with the input, and ii) a representation of accuracy associated with the prediction. Moreover, a retraining subsystem associated with the machine learning system is configured to receive the input, the first prediction, and the representation of accuracy. Further, the retraining subsystem is configured to process the input to generate a second prediction that represents a characteristic associated with the input. The retraining subsystem further determines a sufficiency of certainty of the first prediction based on at least the input, the first prediction, the measure of accuracy, and the second prediction. Based at least on the determined sufficiency of the first prediction, the retraining subsystem causes the machine learning system to be automatically retrained using the input and the first prediction. Alternatively, based on the determined sufficiency of the first prediction, the retraining subsystem causes the machine learning system to be retrained using the input with active learning. Still further and alternatively, based on the determined sufficiency of the first prediction, the retraining subsystem causes the machine learning system to be not retrained.

In one or more implementations, active learning comprises transmitting, by at least one computing device comprised in the machine learning system, to a user device configured with a graphical user interface, information associated with the input and the first prediction to present a representation of the input and the characteristic via the graphical user interface to a user. The at least one computing device can receive from the user device, an acceptance or a rejection of characteristic.

Moreover, in one or more implementations, training the machine learning system can be based at least in part on the acceptance or rejection of the characteristic received from the user device.

Still further, in one or more implementations, the representation of accuracy is a value, and the determining the sufficiency of the first prediction is also based at least on a comparison of the value of the representation of accuracy to a threshold value. The representation of accuracy associated with the first prediction can be a Softmax confidence value.

Still further, the retraining subsystem can include at least one of a second classification model and selection agent.

In addition, transmitting, by a computing device associated with the machine learning system, the first prediction to the computing device associated with the input.

These and other aspects, features, and advantages can be appreciated from the accompanying description of certain embodiments of the invention and the accompanying drawing figures and claims.

BRIEF DESCRIPTION OF THE DRAWINGS

Various features, aspects and advantages of the invention can be appreciated from the following detailed description and the accompanying drawing figures, in which:

FIG. 3 is a flow diagram showing an example routine for automatically collecting and annotating data for training machine learning models, in accordance with one or more embodiments of the present application;

FIG. 6 shows example components and configurations of computing devices that can be used to implement the techniques described herein.

DETAILED DESCRIPTION OF THE EMBODIMENTS

Figure 1:
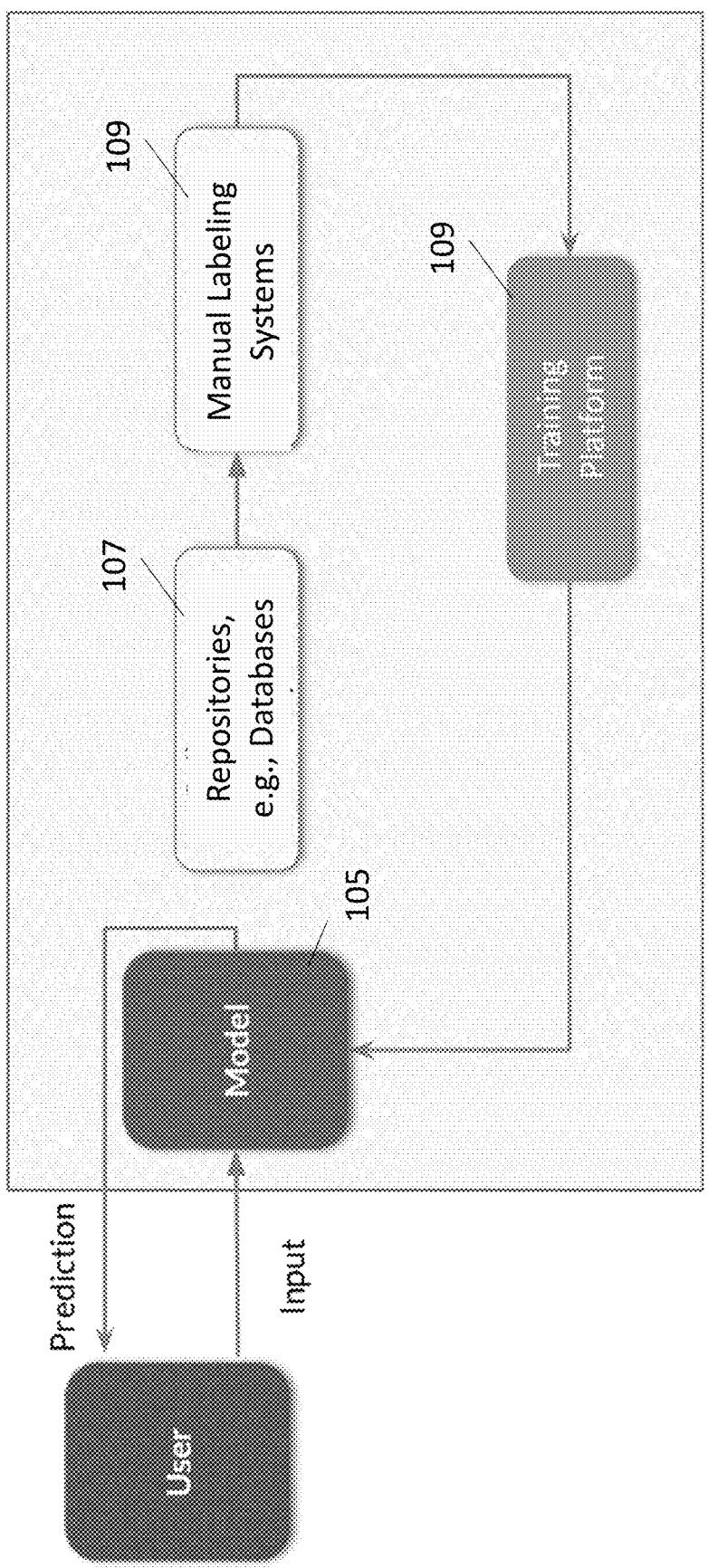
FIG. 1 is a simple block diagram illustrating the use and training of an artificial intelligence system in a prior art implementation.

By way of overview and introduction, the present application includes systems, techniques and interfaces for automatically collecting and annotating data, including to train A/I systems. Such systems can include or otherwise be referred to herein, generally, as "machine learning systems." Machine learning systems in accordance with the present application can include one or more models, referred generally herein as a "classification" models, that are configured to receive and process input and output predictions or other information (e.g., annotating input). As used herein, the term "classification model" can include various machine learning models, including but not limited to a "detection model" or a "regression model." Input can be received as a function of queries, referred to herein generally as "query input." The present application includes a machine learning system that includes a classification model that is configured to process input and provide predictions, and one or more subsystems that are configured to process the input as well as output from the classification model for machine learning training.

In one or more implementations of the present application, training operations associated with a machine learning system can occur while a classification model is in use. For example, training can occur while a classification model is processing input and outputting predictions or other information (e.g., annotations) associated with the input. Accordingly, data that are used in production, i.e., inputs received while running the model, are also used for training purposes. In one or more implementations, the present application can be configured with modules that enable A/I systems to operate in a training mode (e.g., during machine learning) while simultaneously working in production.

In addition, the present application advantageously provides improved systems and methods for automatically receiving multitudes of digital assets for input into and for processing by an A/I system. In particular, the present application can provide one or more application program interfaces ("APIs") for parties to submit digital assets, such as images, audio content, documents, or other content, that can be processed by an A/I system. Moreover, one or more APIs can be used to receive information from an AI system that is associated with processing the input, such as annotations and/or predictions associated the input. An API is useful to automate sending/receiving digital assets to and from an A/I system in bulk without a need for human intervention. Furthermore, use of APIs enables an A/I system to work in production mode, that is to process input to make predictions regarding the input, without interruption.

By way of further overview and introduction, features are provided herein that make functionality associated with A/I systems far more efficient, particularly in connection with input collection and processing. This can occur by providing streamlined operation(s) that reduce the amount of input that would otherwise be used for training A/I systems, i.e., for machine learning. Such streamlining can occur as a function of at least one computerized agent, referred to herein generally as a "selection agent." The selection agent uses information generated by a classification model to determine whether additional learning is indicated or would be effective, including so-called "active learning," in connection with training the machine learning system. Output from a classification model can be used by the selection agent to determine whether active learning is indicated based on a calculated likelihood that a given prediction generated by the classification model is inaccurate. For example, an image of a domestic cat is processed by the classification model, and a prediction is generated that the image is of a lynx, with a 67% likelihood of being accurate. In such case, the selection agent can conclude that active learning is recommended.

In particular, the calculated likelihood of accuracy of a prediction generated by an A/I system can be used and compared with one or more predetermined threshold values. Such comparison can influence automatic decision-making processes that occur in accordance with the teachings herein. For example, a percentage likelihood regarding accuracy associated with a given prediction can influence the selection agent to decide whether to use the prediction to train a model automatically with no further intervention, whether to train a model but only following active learning, or whether a model's prediction associated with input is so inaccurate (i.e., is so far "out of domain") that input should simply be discarded and not used for machine learning. In some cases, a score for a prediction can be used, such as the output of a "Softmax" classifier, while not being a calculated likelihood of accuracy of a prediction, per se. It is to be recognized by one of ordinary skill that virtually any score can be used, provided that the thresholds for automatic training, and active learning are compatible or based on that score.

In one or more implementations, the selection agent can be trained, as well. For example, the selection agent can be configured as a function of one or more algorithms that are trained on fixed embeddings, as known in the art.

Figure 2:
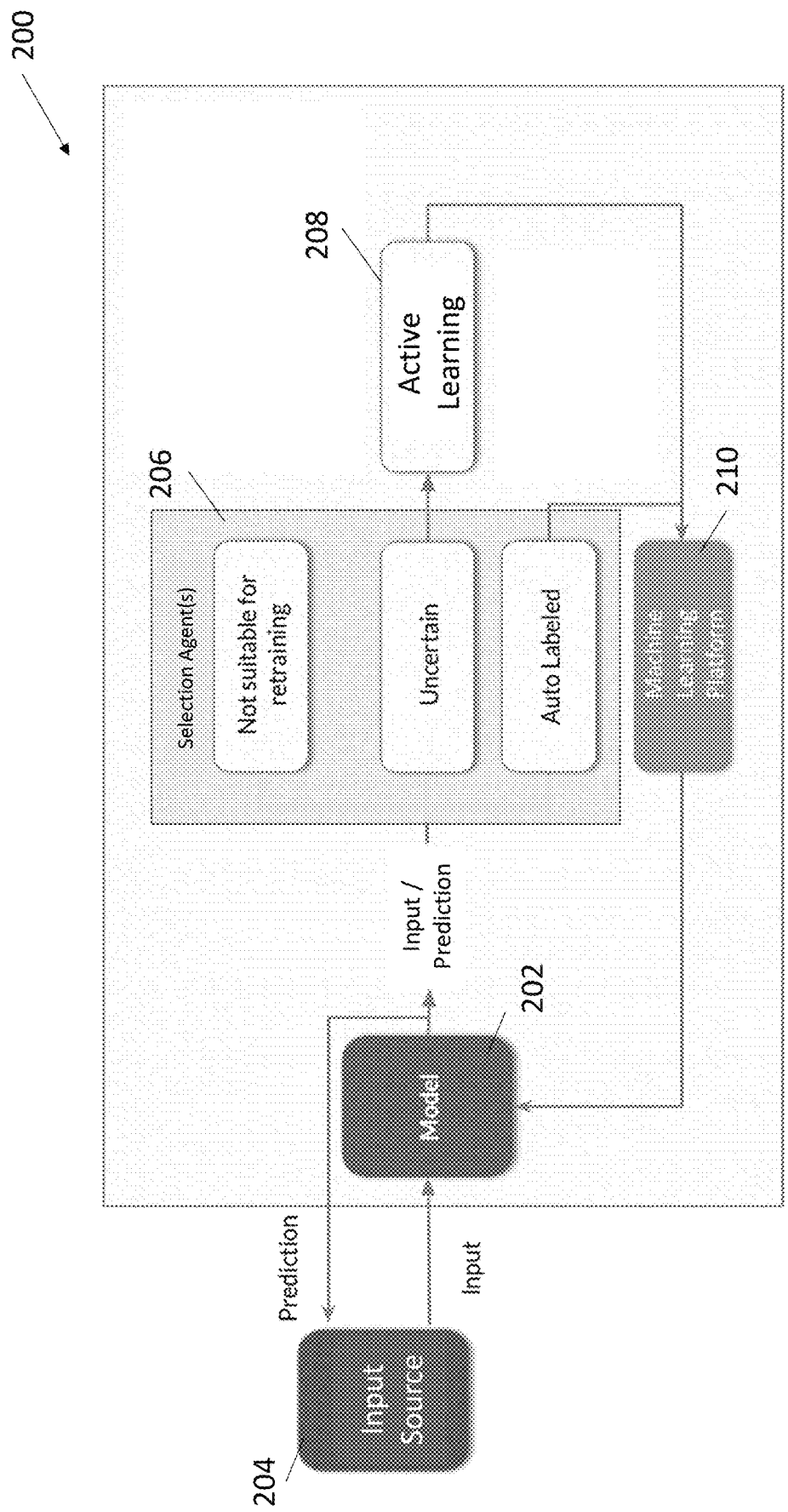
FIG. 2 is a diagram illustrating main components of system of annotating data for training a machine learning model in an example implementation of the present application.

Referring to the drawings, in which like reference numerals refer to like elements, FIG. 2 is a block diagram showing an example implementation of the present application and designated, generally, as system 200. System 200 includes a plurality of modules through which content and corresponding information can be provided, which can include, for example, numerical, textual, graphical, pictorial, audio and video material. Communication of such content can occur by and between one or more of the respective modules, which can be implemented by various computing hardware and software systems, such as described in greater detail below, including in FIGS. 5 and 6. In one or more implementations, any of the modules illustrated in FIG. 2 can include and/or employ hardware and software that collect and/or receive information, process information, and transmit information, in accordance with the teachings herein.

In particular, the modules of system 200 illustrated in FIG. 2 include a classification model 202, which can be configured with a machine learning system and operable for receiving input from an input source 204, including via one or more APIs (not shown). As noted herein, input can include, for example, digital images, audio content, documents, or other suitable content. The classification model 202 processes the input and generates predictions accordingly. For example, the input can include hundreds of thousands of images, and the classification model 202 processes each image and generates a respective prediction for each. As illustrated in FIG. 2, each respective prediction from the classification model 202 is routed to the source of the input, e.g., a calling application via an API. Further, the input and/or prediction from the classification model 202 is routed to the selection agent 206. In addition, or in the alternative, input and/or predictions can be routed to storage, such as in one or more databases, for future processing and use such as by the selection agent 206.

Continuing with reference to FIG. 2, the selection agent 206 receives the input and the classification model's 202 prediction that is associated with the input to perform additional processing, including in connection with training the model 202 (e.g., vis-à-vis machine learning). Alternatively, information associated with respective input, such as an identifier associated with an image (e.g., "Image_1302"), can be provided to the selection agent 206 separately or with the input. Of course, one of ordinary skill will recognize that there are various ways of associating input with a respective prediction generated by the classification model 202, which are supported by the teachings herein. Notwithstanding any particular implementation, the selection agent 206 can be configured to determine various next steps. For example, the selection agent 206 can assess whether the prediction generated by the classification model 202 is suitable for training the model 202 automatically and without human intervention, whether the accuracy of the prediction is called into question and can be resolved via active learning, or whether the prediction generated by the model 202 is very likely to be inaccurate and "out of domain," and thus not suitable for training the model 202, and should be discarded.

In one or more implementations, the selection agent 206 and the model 202 are configured to execute one or more algorithms, referred to herein generally as classifiers. The classifier can operate to form predictions, for example, based on probabilistic outcomes. In one or more implementations of the present application, the predictions formed by a classifier can be associated with input that has already been predicted by the classification model 202. For example, a classifier can utilize clustering in embedding space associated with information (e.g., predictions associated with input) that were previously used to train the model 202.

More specifically, the selection agent 206 can include a classifier, referred to herein generally as a "rejection classifier." The rejection classifier can be considered a "weak classifier" in that it is a learned classifier but is only somewhat correlated with true classification. In other words, the rejection classifier may not be particularly accurate at classifying input, such as by generating a prediction regarding a classification associated with an image. Instead, the rejection classifier is configured to identify respective input that has a very high likelihood of having an accurate prediction generated by the classification model 202, and effectively to confirm or reject the model's 202 prediction.

For example, an image is received by the classification model 202 and classified by the model 202 having a Softmax output, as known in the art, that is greater than 0.99. The rejection classifier operates on the same image and confirms the classification. In such case, the selection agent 206 directs that the image be auto-labeled, without human intervention, and the image and prediction are provided to a machine learning platform 210 for retraining the model 202. Alternatively, the rejection classifier operates on the image and rejects the prediction generated by the classification model 202 that is associated with the image. For example, the input is classified as a "cat" but has embedding far outside the set of embeddings used to train model 202 for the "cat" category. In such case, the image and/or prediction generated by the classification model 202 is deemed out of domain and not suitable for retraining the model 202. In a practical sense, input that is deemed out of domain by the selection agent 206 is likely to have a Softmax confidence (or other score) generated by the classification model 202 that is lower than 0.99.

In yet another alternative, the rejection classifier operates on the image and rejects the prediction generated by the classification model 202, but the image and/or prediction is not deemed out of domain. Such determination can be based on a value, for example, the Softmax output set forth by the original prediction generated by the classification model 202. In addition, or in the alternative, such determination can be based on clustering in the embedding space (e.g., from a deep neural network) of images. For example, the input may have embedding that are outside the embedding space of similarly classified inputs, but not so far outside as to be completely unusable. In light of the uncertainty associated therewith, the image and/or prediction is forwarded for active learning 208. Thereafter, the results of active learning are forwarded to the machine learning platform 210 for retraining the model 202.

Turning now to FIG. 3, a flow diagram is described showing an example routine 300 that illustrates a broad aspect of the method for automatically collecting and annotating data for training machine learning models in accordance with one or more embodiments of the present application. Among other objectives, the routine 300 improves and optimizes machine learning, including by removing outliers from consideration during retraining, streamlining machine learning processes, and maintaining production operations while training the model 202.

It is to be appreciated that several of the logical operations described herein are implemented as a sequence of computer-implemented acts or program modules running on one or more computing devices that are operatively connected (e.g., mobile computing device, server computing device) and/or as interconnected machine logic circuits or circuit modules within the system. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than those shown in the figures and described herein. These operations can also be performed in a different order than those described herein.

Continuing with reference to FIG. 3, the process begins at step 301. At step 302, input in the form of digital assets, such as images, audio content, documents or the like, is received by classification model 202. For example, input is received from a sending device via one or more APIs. For exemplary purposes only and in connection with the remainder of the description corresponding to FIG. 3, the input that is received at step 302 includes images. At step 304, the input is sequentially processed (e.g., image by image) in order to generate respective predictions associated with each image (step 304). In addition to generating a prediction, a value such as a percentage is generated at step 304, which represents a probability of accuracy of the prediction. For example, the value can represent a Softmax confidence. At step 306, the input is annotated using the prediction generated in step 304 and returned to the sending device via one or more APIs. Thereafter, before, or simultaneously, the input is received by the selection agent 206, for example, that is configured with a rejection classifier as described herein (step 308). In addition or in the alternative, the prediction generated by the classification model 202 is also received by the selection agent 206.

Thereafter, at step 310, the input is processed by the rejection classifier and a prediction is generated and optionally a value representing a probability of accuracy. At step 312, a determination is made whether the input and prediction generated by the classification model 202 is within one or more predetermined threshold values, which are usable for directing further processing, as shown and described herein. The determination at step 312 can be based at least partially on the probability of accuracy generated by the classification model 202 at step 304 and/or at step 310 by the rejection classifier at step 310.

Continuing with reference to the flow diagram shown in FIG. 3, two respective predetermined threshold values, shown as Threshold I and Threshold II. In one or more implementations of the present application, the value associated with Threshold II is higher than the value associated with Threshold I. Threshold I can be a value representing a minimum sufficiency for the input and/or prediction to be usable (e.g., the input is in domain). If the probability determined at step 312 is below Threshold I, then the process branches to step 314 and the input is deemed out of domain and discarded. Thereafter, the process branches to step 322, and the process ends. In addition, Threshold II can be a value representing a level of sufficiency for automatic labeling and retraining of the machine learning system (e.g., classification model 202) without any human intervention. If the probability determined at step 312 is equal to or above Threshold II, then the process branches to step 316 and the input is directed to be auto-labeled, without human intervention. Thereafter, at step 318 the input and prediction are provided to a machine learning platform 210 for retraining the model 202. Thereafter, the process branches to step 322, and the process ends. Alternatively, if the determination at step 312 is that the probability is above Threshold I, but below Threshold II, then the process branches to step 320 for active learning, which is described in greater detail herein and with particular reference to FIGS. 4A and 4B. Following active learning, the process continues to step 318 and proceeds with machine learning. Thereafter, the process branches to step 322, and the process ends.

Thus, as shown and described with regard to FIG. 3, the present application is configured for processing of content and engaging in classifying of input and, when appropriate, machine learning. Such processing utilizes a learned classifier (e.g., model 202) in conjunction with a different, preferably weak, classifier (e.g., the rejection classifier of selection agent 206). For example, the rejection classifier is weaker than the classification model 202 in terms of learnable degrees of freedom, which ensures that one classifier can (but does not have to) generate predictions that are different than that of the classification model 202. It is to be appreciated that the combined classifiers are useful to determine whether to direct input to active learning, or whether content is "out of domain" and should be discarded. In one or more implementations of the present application, values associated with output from step 316 can be queued or otherwise collected prior to be used in step 318 for machine learning. In this way, multiple training values can be used for training at once, and the same value can be used in multiple stages of the training.

Figure 4A:
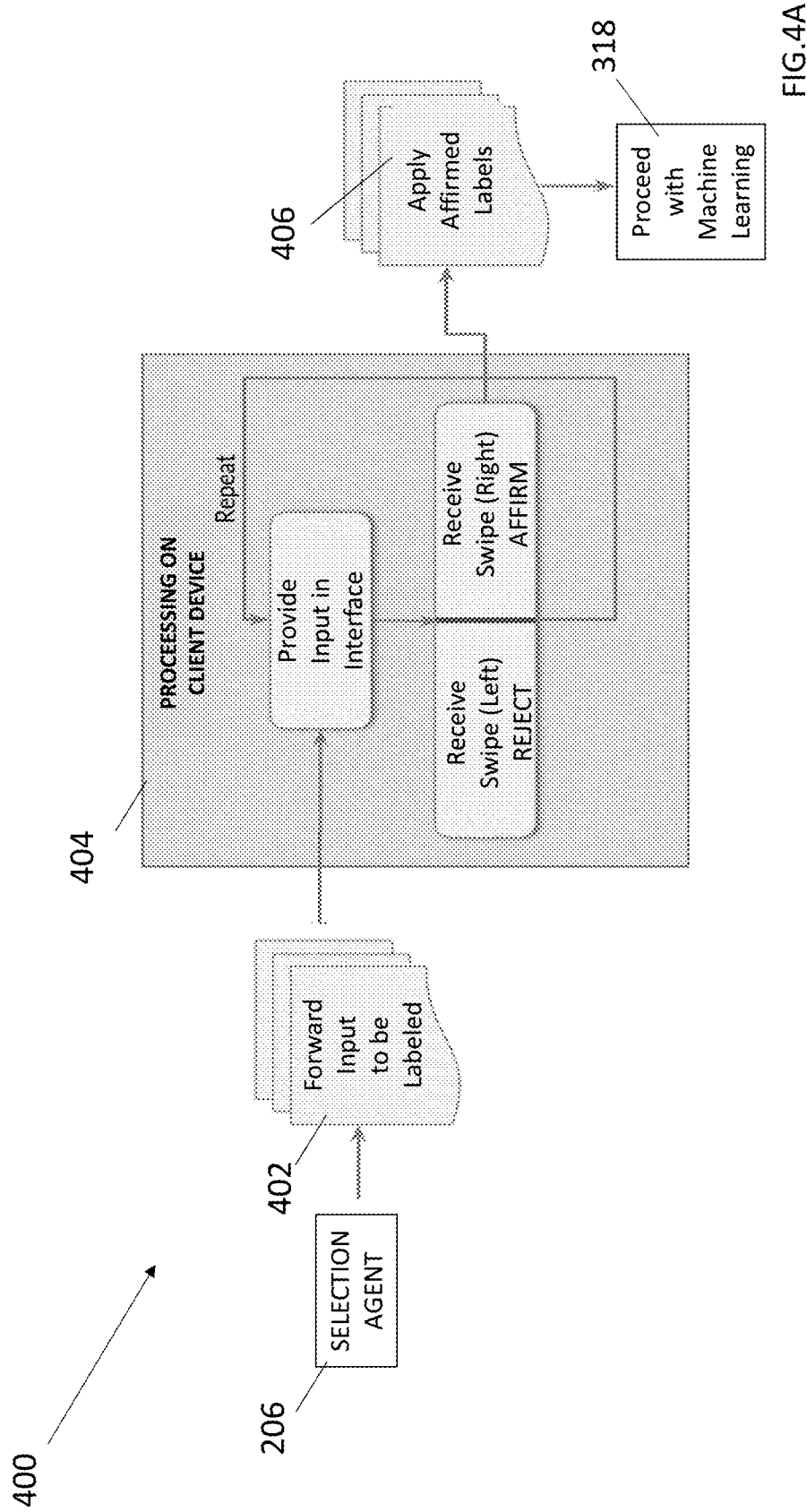
FIG. 4A is a block diagram illustrating steps associated with active learning and includes a depiction of applying labels that have been affirmed, in accordance with one or more embodiments of the present application.
Figure 4B:
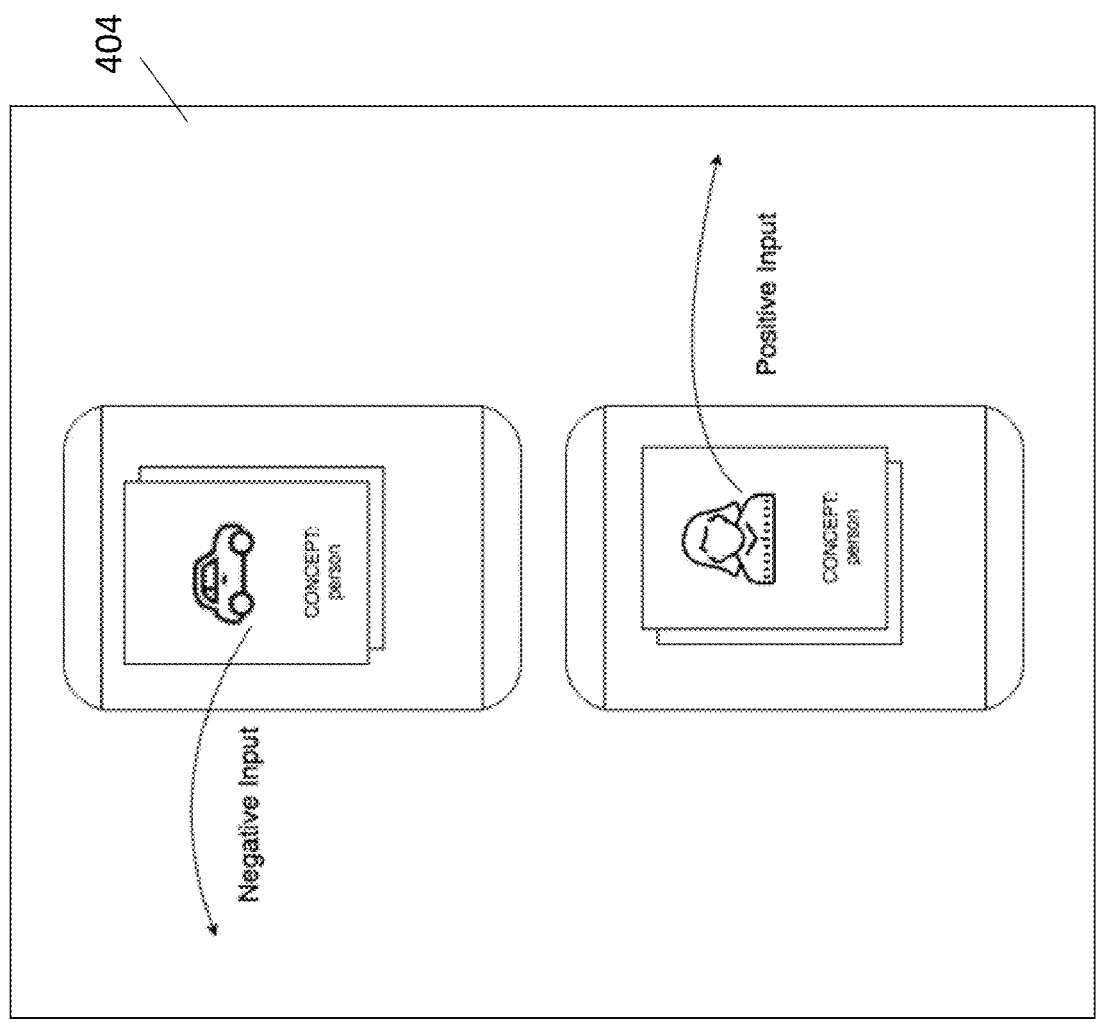
FIG. 4B illustrates an example of processing input, in accordance with an example labeling interface in use.

FIG. 4A is a block diagram illustrating steps associated with active learning 208 and includes a depiction of applying labels that have been affirmed. In the example shown in FIG. 4A, after the selection agent 206 determines at step 312 (FIG. 3) to proceed with active learning, input to be labeled is forwarded for active learning (step 402). The forwarded input is forwarded for processing on a client device (step 404), which can be configured with one or more applications and graphical user interfaces to assist with active learning. For example, input is provided in a graphical user interface executing on a user's device. The interface can be instantiated on various platforms and devices, such as a web browser interface, on mobile applications, etc.). In one or more implementations, a sample of input is provided to the user with a suggested label, for example, as generated from the classification model 202. The user can be provided with selectable options to reject or accept the suggested label, for example by simply swiping left or right on a touchscreen-enabled device, or by dragging the image left or right on a mouse-based system. Regardless of the particular implementation, once the user accepts the label (e.g., by swiping right to affirm that the label is correct), then the accepted label and input can be applied (step 406) and used to proceed with machine learning (step 318, FIG. 3). Alternatively, if the user rejects the label (e.g., by swiping left), then the input can be re-used in the future, for example, with a different suggested label. In one or more implementations, the suggested labels can be determined, for example, by the Softmax output from the classification model 202. This process can repeat until all suggested labels are provided in the interface and all rejected or one affirmed. The interface is designed to maximize efficiency, convenience, and speed. FIG. 4B illustrates an example of processing input 404 in accordance with the interface in use.

Figure 5:
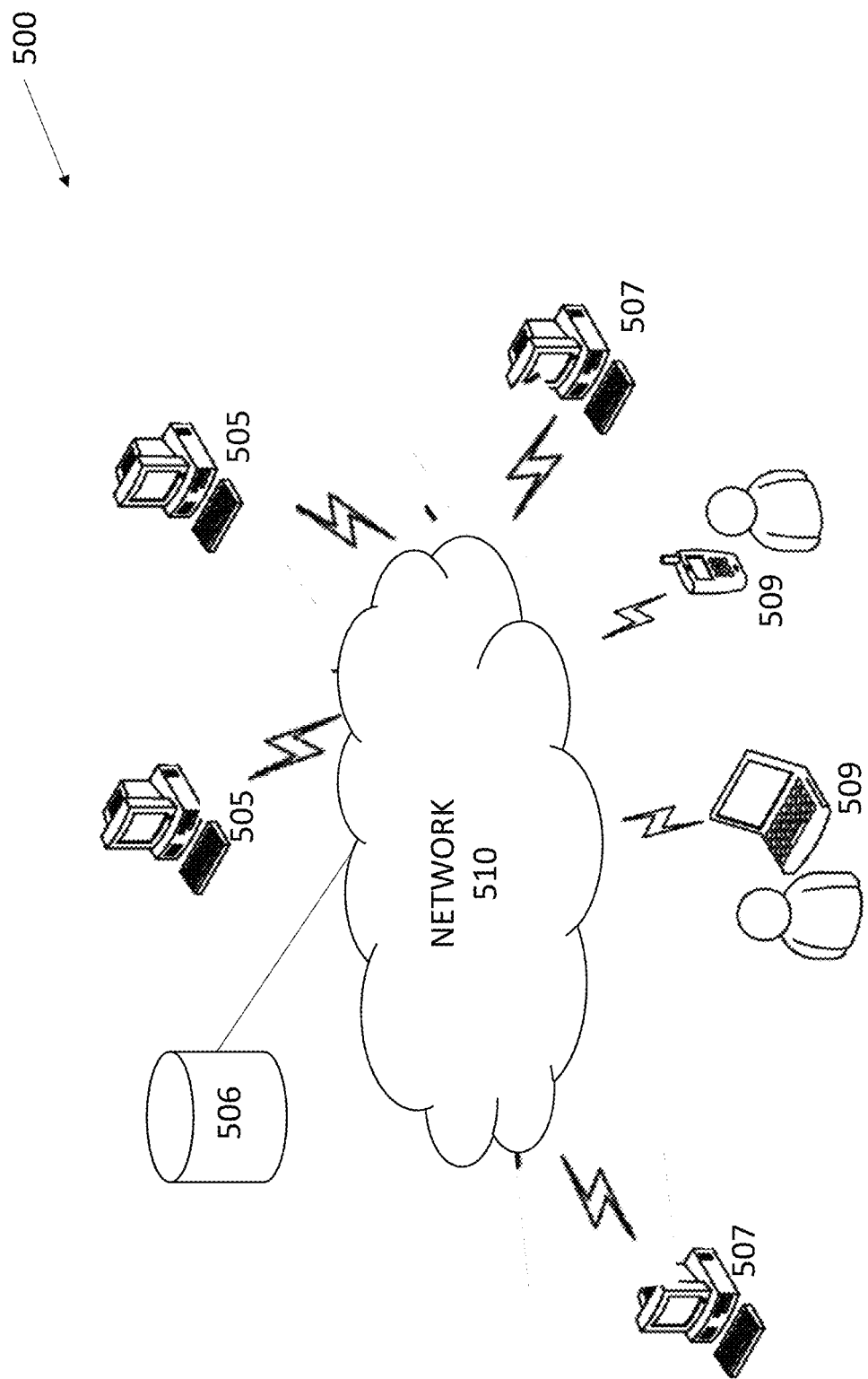
FIG. 5 is a block diagram illustrating a hardware arrangement in connection with an example implementation of the present application.

FIG. 5 is a block diagram illustrating a hardware arrangement in connection with an example system and method for obtaining and annotating training instances for improving machine learning models in accordance with one or more implementations of the present application and designated generally as system 500. System 500 can include one or more computing devices 505, which can provide features shown and described herein. Devices 505 can be connected to a network 510, which can be at least one of a local area network (LAN), wide area network (WAN), the Internet, one or more telephony networks or a combination thereof. Computing device(s) 505 can be at least one of computer, tablet computer, cellphone, or any other device suitable for providing goods/services herein, including in the form of a machine learning system. Further, one or more computing devices 507 can connect to device(s) 505, for example via an API, including to send/receive digital assets to be processed by device(s) 505. Moreover, device 505 can access or otherwise be associated with database 506, which can include digital assets, predictions associated with digital assets, and/or other data suitable for presenting the systems and methods shown and described herein.

Continuing with reference to FIG. 5, user computing devices 509 can connect to one or more devices 505 and/or database. Devices 509 can be a computer, cell phone, iPad, or any other suitable device that can be configured with an application and interface, such as shown and described in connection FIGS. 4A and 4B.

FIG. 6 illustrates example functional elements of one or more computing devices 505/507/509, and shows one or more processors 602 used to execute software code in order to control operation of one or more device(s) 505/507/509. FIG. 6 further illustrates read only memory (ROM) 604, random access memory (RAM) 606. Any other suitable volatile or non-volatile volatile computer readable storage medium, which can be fixed or removable, can also be configured with any device 505/507/509 (not shown). FIG. 6 also includes one or more network interfaces 608, which are usable to transmit and receive data to and from computing devices across a communication network. The network interface 608 can be any interface that enables communication between the any of the devices shown in FIG. 5 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the devices and/or communication networks, such as private networks and the Internet. Such connections can include a wired connection or a wireless connection (e.g., using the IEEE 802.11 standard known in the relevant art) though it should be understood that network interface 608 can be practically any interface that enables communication to/from the processor 602.

Continuing with reference to FIG. 6, storage device(s) 610 are also shown, and can include any suitable storage such as a hard disk drive, CD-ROM or DVD drive, flash memory, rewritable optical disk, rewritable magnetic tape, floppy disk drive, tape drive, or some combination of the above for storing program code, databases, application code, and/or other content. In certain implementations, memory 604, 606 and/or storage device(s) 610 are accessible by the processor 602, thereby enabling the processor 602 to receive and execute instructions stored on the memory 604, 606 and/or on the storage 610. Further, elements include one or more input devices 612 such as a keyboard, mouse, touchscreen, touchpad, track ball and the like, and a display 614. The display 614 can include a screen or any other such presentation device that enables the system to instruct or otherwise provide feedback to the user regarding the operation of the system 100. By way of example, display 614 can be a digital display such as an LCD display, a CRT, an LED display, or other such 2-dimensional display as would be understood by those skilled in the art. By way of further example, a user interface and the display 614 can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, control functions, etc. So, when the touch screen is touched, interface communicates this change to processor, and settings can be changed, or user entered information can be captured and stored in the memory.

One or more software modules can be encoded in the storage device(s) 610 and/or in the memory 604, 606. The software modules can comprise one or more software programs or applications having computer program code or a set of instructions executed in the processor 602. Such computer program code or instructions for carrying out operations or aspects of the systems and methods disclosed herein can be written in any combination of one or more programming languages, as would be understood by those skilled in the art. The program code can execute entirely on one computing device (e.g., device 505) as a stand-alone software package, partly on one device and partly on one or more remote computing devices or entirely on one or more remote computing devices. In the latter scenario and as noted herein, the various computing devices can communicate via any type of wired or wireless network, including a local area network (LAN) or a wide area network (WAN), or the connection can be made to an external computer (for example, through the Internet using an Internet Service Provider). It should be understood that in some illustrative embodiments, one or more of the software modules can be downloaded over a network from another device or system via the network interface 608. For instance, program code stored in a computer readable storage device in a server can be downloaded over a network from the server to the storage 610.

Thus, the various components of devices 505/507/509 need not be physically contained within the same chassis or even located in a single location. For example, as explained above with respect to databases which can reside on storage device 610, storage device 610 may be located at a site which is remote from the remaining elements of device 505, and may even be connected to CPU 602 across network 510 via network interface 608. Accordingly, it is to be appreciated that several of the logical operations described herein are implemented (1) as a sequence of computer implemented acts or program modules running on the various devices of the system 500 and/or (2) as interconnected machine logic circuits or circuit modules within the system 500. The actual implementation is a matter of design choice dependent on the requirements of the device (e.g., size, energy, consumption, performance, etc.). Accordingly, the logical operations described herein are referred to variously as operations, steps, structural devices, acts, or modules. As referenced above, the various operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The nature of the present application is such that one skilled in the art of writing computer executed code (software) can implement the described functions using one or more or a combination of a popular computer programming languages and technologies including, but not limited to, C++, VISUAL BASIC, JAVA, ACTIVEX, HTML, XML, ASP, SOAP, IOS, ANDROID, TORR and various web application development environments.

As used herein, references to displaying data on computing device 505/507/509 refer to the process of communicating data to the computing device across network 510 and processing the data such that the data can be viewed on the computing device 505/507/509 display 614 using a web browser or the like. The display screens on computing device 505/507/509 present areas within system 500 such that a user can proceed from area to area within the system 500 by selecting a desired link. Therefore, each user's experience with system 500 will be based on the order with which (s)he progresses through the display screens. In other words, because the system is not completely hierarchical in its arrangement of display screens, users can proceed from area to area without the need to "backtrack" through a series of display screens. For that reason and unless stated otherwise, the following discussion is not intended to represent any sequential operation steps, but rather the discussion of the components of system 100.

As used herein, the terms "function" or "module" refer to hardware, firmware, or software in combination with hardware and/or firmware for implementing features described herein. In the hardware sense, a module can be a functional hardware unit designed for use with other components or modules. For example, a module may be implemented using discrete electronic components, or it can form a portion of an entire electronic circuit such as an Application Specific Integrated Circuit (ASIC). Numerous other possibilities exist, and those of ordinary skill in the art will appreciate that the system can also be implemented as a combination of hardware and software modules. In the software sense, a module may be implemented as logic executing in a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware. Moreover, the modules described herein can be implemented as software modules, but may be represented in hardware or firmware. Generally, the modules described herein refer to logical modules that may be combined with other modules or divided into sub-modules despite their physical organization or storage.

Additional components, not shown, may also be part of the device 505/507/509, and, in certain embodiments, fewer components than that shown in FIG. 6 may also be used in other of devices 505/507/509. Thus, the techniques are not limited to any specific combination of hardware circuitry and software, or to any particular source for the instructions executed by the computing device 505/507/509.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed:

1. A method for retraining a machine learning system, the method comprising:
    processing, by a previously trained classification model associated with the machine learning system, an input to generate i) a first prediction that represents a characteristic associated with the input, and ii) a representation of accuracy associated with the prediction;
    receiving, by a retraining subsystem associated with the machine learning system, the input, the first prediction, and the representation of accuracy;
    comparing, by a selection agent of the retraining subsystem, the representation of accuracy to a first threshold value and a second threshold value; and
    based at least on the comparison:
    i) causing, by the retraining subsystem, the machine learning system to be automatically retrained using the input and the first prediction in the case the representation of accuracy is greater than the first threshold value;
    ii) causing, by the retraining subsystem, the machine learning system to be retrained using the input with active learning in the case the representation of accuracy is less than the first threshold value and greater than the second threshold value; and
    iii) causing, by the retraining subsystem, the machine learning system not to be retrained using the input in the case the representation of accuracy is less than the second threshold value.

2. The method of claim 1, wherein causing the machine learning system to be retrained using the input with active learning further comprises:
    transmitting, by at least one computing device comprised in the machine learning system, to a user device configured with a graphical user interface, information associated with the input and the first prediction to present a representation of the input and the characteristic via the graphical user interface to a user.

3. The method of claim 2, further comprising:
    training, by the at least one computing device, the machine learning system as a function of an acceptance or rejection of the characteristic received from the user device.

4. The method of claim 2, wherein the information associated with the input is a copy of the input.

5. The method of claim 1, wherein the representation of accuracy associated with the first prediction is a Softmax confidence value.

6. The method of claim 2, the method further comprising receiving, upon a single action of a user operating the user device, an acceptance or a rejection of the characteristic.

7. The method of claim 1, wherein the retraining subsystem comprises at least one of a second classification model.

8. The method of claim 1, wherein determining the sufficiency of certainty of the first prediction includes determining that the first prediction is out of domain.

9. The method of claim 1, wherein the input is received from a computing device associated with the input, and further comprising:
    transmitting, by a computing device associated with the machine learning system, the first prediction to the computing device associated with the input.

10. A system for retraining a machine learning system, the system comprising:
    a previously trained classification model comprising at least one computing device associated with the machine learning system, wherein the previously trained classification model is configured to process an input to generate i) a first prediction that represents a characteristic associated with the input, and ii) a representation of accuracy associated with the prediction, wherein the representation of accuracy is a value;

a retraining subsystem comprising at least one computing device that is associated with the machine learning system, wherein the retraining subsystem is configured by executing code to:

receive the input, the first prediction, and the representation of accuracy;

determine a sufficiency of certainty of the first prediction based on at least the input, the first prediction, the value and by a comparison of the value to a first threshold value and a second threshold value; and based at least on the determined sufficiency of the first prediction, the retraining subsystem is configured by executing code to:

i) cause the machine learning system to be automatically retrained using the input and the first prediction in the case the value is greater than the first threshold value;

ii) cause the machine learning system to be retrained using the input with active learning in the case the value is less than the first threshold value and greater than the second threshold value; or iii) cause the machine learning system to be not trained in the case the value is less than the second threshold value.

11. The system of claim 10, wherein causing the machine learning system to be retrained using the input with active learning further comprises:

at least one computing device comprised in the machine learning system that is configured by executing code to:

transmit to a user device configured with a graphical user interface, information associated with the input and the first prediction to present a representation of the input and the characteristic via the graphical user interface to a user; and receive, from the user device, an acceptance or a rejection of characteristic.

12. The system of claim 11, further comprising:

at least one computing device comprised in the machine learning system that is configured by executing code to train the machine learning system as a function of the acceptance or rejection of the characteristic received from the user device.

13. The system of claim 11, wherein the information associated with the input is a copy of the input.

14. The system of claim 10, wherein the representation of accuracy associated with the first prediction is a Softmax confidence value.

15. The system of claim 10, further comprising at least one computing device associated with the machine learning system that is configured by executing code to store the input for future use by the machine learning system.

16. The system of claim 10, wherein the retraining subsystem comprises at least one of a second classification model and selection agent.

17. The system of claim 10, wherein the retraining subsystem is further configured to determine the sufficiency of certainty of the first prediction by determining that the first prediction is out of domain.

18. The system of claim 10, wherein the input is received from a computing device associated with the input, and further comprising:

a computing device associated with the machine learning system which is configured to transmit the first prediction to the computing device associated with the input.

* * * * *